INVENTOR
CORNELIS VAN DER LELY
by
Mason, Mason & Albright
Attorneys

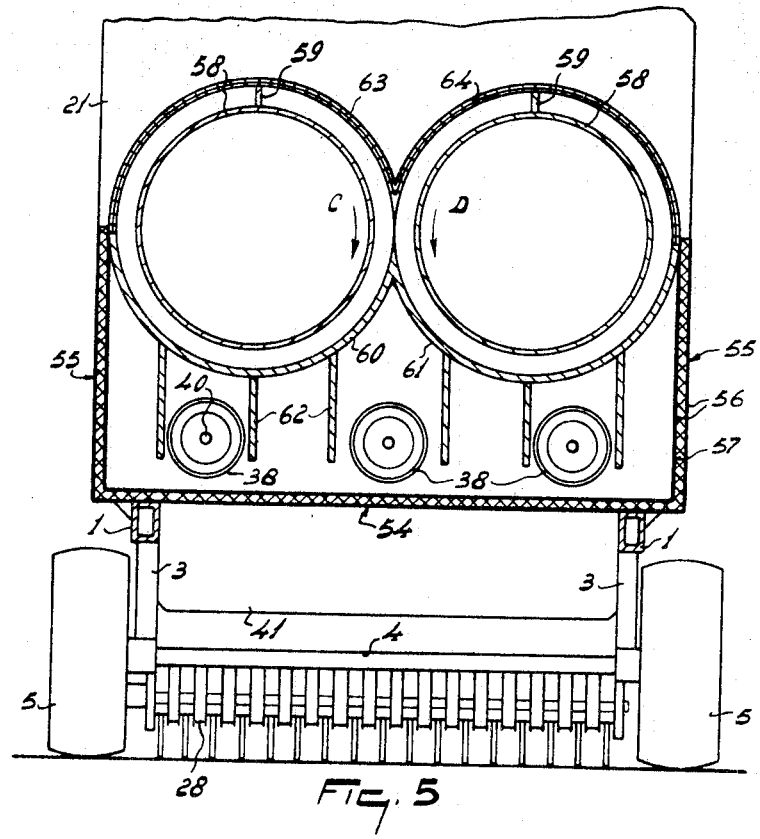
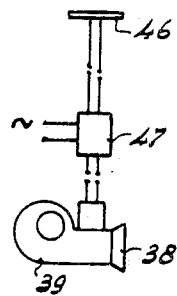
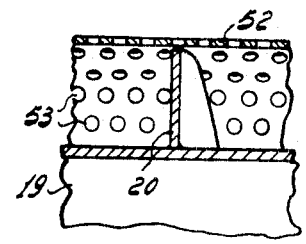

United States Patent Office 3,512,765
Patented May 19, 1970

3,512,765
CROP-DRYING SYSTEM
Cornelis van der Lely, 7 Bruschenrain, Zug, Switzerland
Filed May 22, 1968, Ser. No. 731,011
Claims priority, application Netherlands, May 31, 1967,
6707517
Int. Cl. F27b 7/08
U.S. Cl. 263—34                                    37 Claims

ABSTRACT OF THE DISCLOSURE

This invention relates to a crop-drying system in which a heating apparatus is positioned to heat a mechanism for conveying crop through the system. The conveying mechanism includes a rotary drum with strips that moves crop over a heated surface towards an exit.

According to the invention, there is provided a crop-drying system wherein the conveying means is arranged to move crop over a supporting member that can be heated by the heating apparatus during use of the system.

For a better understanding of the invention, and to show how the same may be carried into effect, reference will now be made, by way of example, to the accompanying drawings, in which:

BRIEF DESCRIPTION OF THE DRAWINGS

FIG. 3 is a diagrammatic sketch of mechanism for controlling the operating temperature of the system, FIG. 4 is a fragmentary view showing an alternative construction of part of the system of FIGS. 1 to 3, and FIG. 5 substantially corresponds to FIG. 2 but shows an alternative form of vehicle-mounted crop drying system in accordance with the invention.

DESCRIPTION OF THE PREFERRED EMBODIMENTS

Figure 1:
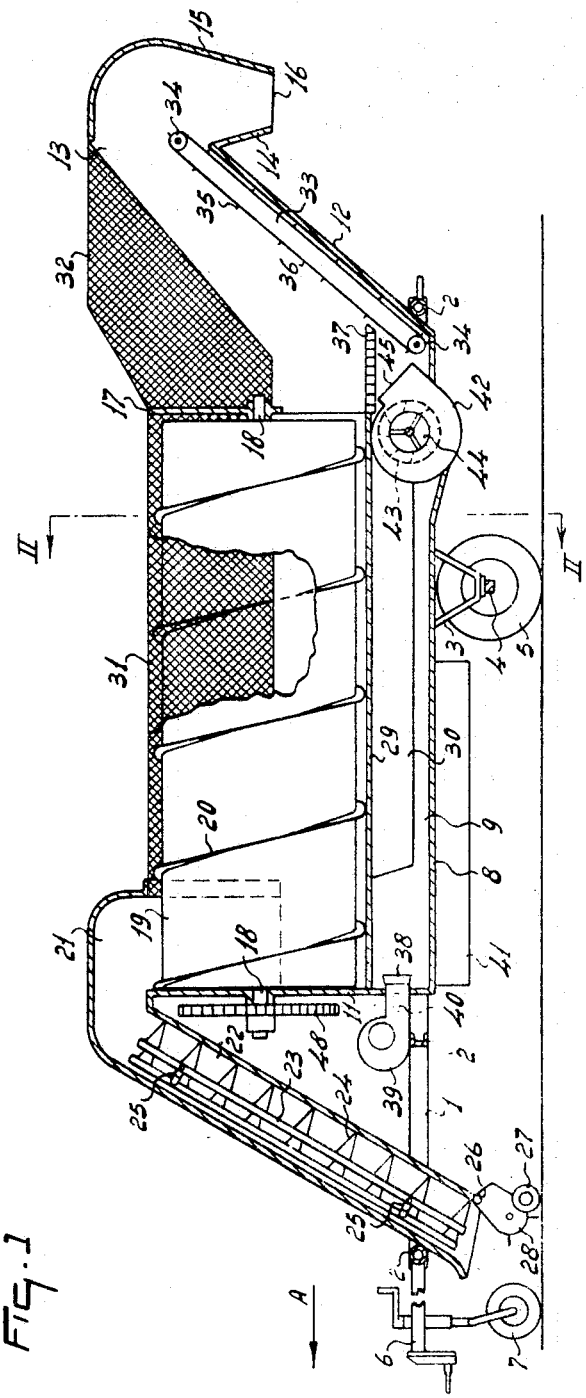
FIG. 1 is a longitudinal and vertical section of a vehicle-mounted crop-drying system in accordance with the invention.
Figure 2:
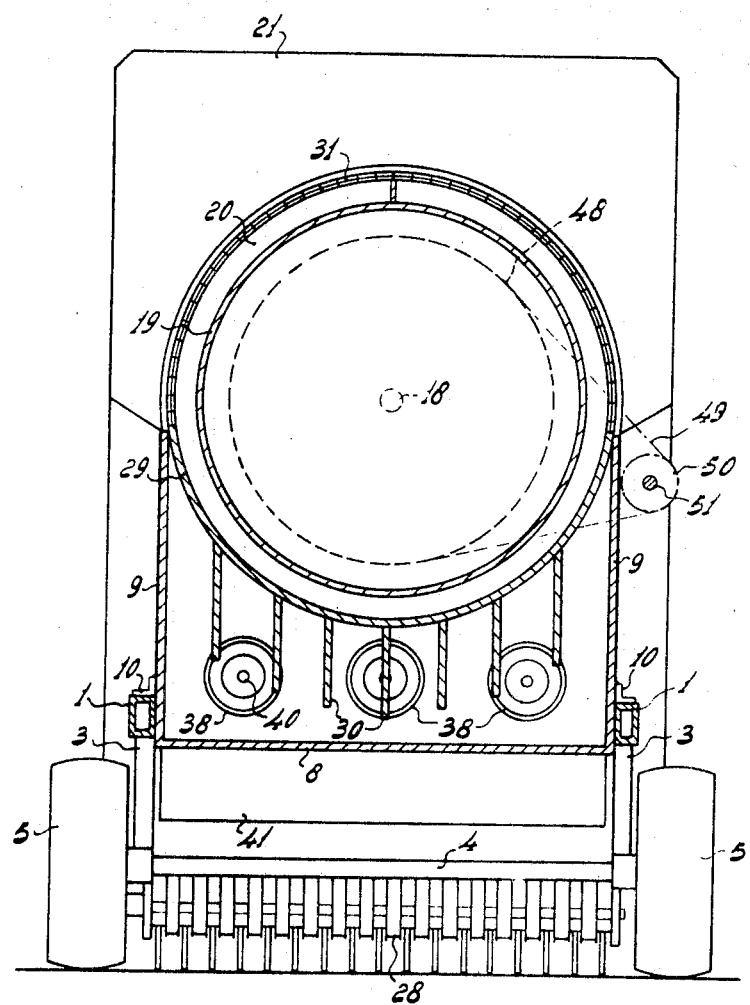
FIG. 2 is a section, to an enlarged scale, taken on the line II—II of FIG. 1.

Referring to FIGS. 1 to 3 of the drawings, the vehicle-mounted crop-drying system which is illustrated has a frame that includes two beams 1 lying at opposite sides of the vehicle and extending substantially horizontally parallel to its intended direction of operative travel, this direction being indicated by an arrow A in FIG. 1 of the drawings. The beams 1 are rigidly interconnected by beams 2 that extend substantially horizontally perpendicular to the direction A. Supporting brackets 3 depend from the frame beams 1 and an axle shaft 4 is fastened to them so as to extend parallel to the beams 2. Ground wheels 5 are rotatably mounted at opposite ends of the axle shaft 4. A drawbar 6 projects forwardly from the leading frame beam 2 and is arranged for connection to the tow bar or hitch of an agricultural tractor or other vehicle. The drawbar 6 is provided with a caster ground wheel 7 (smaller than the ground wheels 5) the level of the axle of which can be raised and lowered relative to said drawbar 6 in a manner which is conventional, with the aid of the crank which can be seen in FIG. 1 of the drawings.

The superstructure of the vehicle comprises a floor plate 8 to which vertical side walls 9 are fastened. Angular supports 10 (FIG. 2) are rigidly secured to the outer surfaces of the side walls 9, their horizontally disposed limbs bearing downwardly upon the beam 1 so as to be supported by the latter. A vertical front wall 11 interconnects the leading edges of the sidewalls 9 and the leading edge of the floor plate 8 while a rear wall 12 is inclined upwardly and rearwardly with respect to the direction A, from its lowermost edge which edge is coincident with the rearmost edge of the floor plate 8. Two profiled plates 13 are substantially coplanar with the respective side walls 9, the rearmost edges of said plates 13 being interconnected by the inclined rear wall 12 that has just been mentioned. The upper edge of the rear wall 12 has a plate 14 depending from it, said plate 14 being inclined downwardly, and rearwardly relative to the direction A, from its connection to the wall 12. A generally curved plate 15 perpendicularly interconnects rear edge regions of the two plates 13 in such a way as to form a downwardly directed delivery outlet 16. It is preferred, but is not essential, that those portions of the two plates 13 that are located between the plates 14 and 15 should converge downwardly towards one another so that the width of the delivery outlet 16 (in a direction perpendicular to the plate of FIG. 1) will be less than the width of the superstructure of the vehicle in the same direction.

A plate 17 that is parallel to the front wall 11 is secured to the two side walls 9 towards the rear of the superstructure of the vehicle, said plate 17 being located above the upper edges of the side walls 9 to a large extent. Horizontal bearings carried by the front wall 11 and the plate 17 rotatably receive horizontally aligned stub shafts 18 that project from the opposite ends of a rotatable drum 19. The stub shafts 18 are coincident with the longitudinal axis of the drum 19, said axis extending substantially parallel to the direction A. A strip 20 is secured to the outermost curved surface of the drum 19 and is wound helically around the axis of the drum from one end thereof to the other. The strip 20 extends radially with respect to the longitudinal axis of the drum 19 and preferably has a width of about 10 centimeters. The drum 19 and strip 20 together form an Archimedean screw conveyor the overall diameter of which is preferably about 150 centimeters. The uppermost edges of the side walls 9 extend parallel to, and are located just beneath, a substantially horizontal plane containing the axis of rotation of the drum 19.

Leading end regions of the side walls 9 are joined by the walls of a chamber 21 located at the upper end of an upwardly inclined feeding channel 22. The channel 22 accommodates a number of longitudinally extending supports 23 to each of which a row of triangular teeth 24 is secured. The supports 23 are mounted on the crank pins of upper and lower crank shafts 25 that are rotatable about substantially horizontal axes located in the channel 22 so as to extend generally perpendicular to the direction A. A rotary crop pickup mechanism 28 that is supported above the ground by small ground wheels 27 is pivotally connected to the lowermost end of the channel 22 by a shaft 26 that extends substantially horizontally perpendicular to the direction A. A lower portion of the Archimedean screw conveyor is embraced by a curved plate 29 whose center of curvature substantially corresponds with the common longitudinal axis of the stub shafts 18, the uppermost edges of the curved plate 29 being secured to those of the respective side walls 9. The lowermost convex side of the plate 29 has a plurality of relatively spaced vertical plates 30 secured to it in such a way that said plates 30 extend parallel to the direction A. The plates 30 afford downwardly directed ridge-like extensions of the curved plate 29.

It will be seen from FIG. 1 of the drawings that the chamber 21 extends rearwardly from the front wall 11 throughout a distance which is not more than about one-seventh of the length of the drum 19. The remaining part of the Archimedean screw conveyor which includes the drum 19 is embraced on the upper side by a wall 31 formed from metal gauze. The semi-cylindrical wall 31 has its axis of curvature substantially coincident with that of the drum 19, said wall adjoining the edges of the chamber 21 and the upper edges of the curved plate 29. The upper edges of the profiled plates 13 adjoin upwardly ascending metal gauze walls 32 whose uppermost edges, in turn, are interconnected by a transverse metal gauze wall that is not visible in the drawings.

An endless conveyor 33 is disposed close to the rear wall 12 of the superstructure in generally parallel relationship with that rear wall. The conveyor 33 includes upper and lower rotary drums 34 whose axes of rotation extend horizontally perpendicular to the direction A, an endless belt 36 that is guided around said drums 34 and a plurality of crop-engaging catches or teeth 35 spaced at regular intervals along the length of the belt 36. A horizontally disposed grating 37 bridges the greater part of the space between the rearmost end of the plate 29 at its lowermost point and the front of the conveyor 33.

A lowermost portion of the front wall 11 of the superstructure that is disposed between the floor plate 8 and the curved plate 29 is formed with three openings through which the rearwardly directed delivery spouts 38 of three blowers 39 are entered, said spouts 38 extending rearwardly from the blowers 39 in directions that are substantially parallel, but opposite, to the direction A. Each spout 38 accommodates a corresponding burner 40 for liquid or gaseous fuel, the three burners 40 being connected by ducts that are not shown in the drawings to a fuel tank 41 that is located beneath the floor plate 8.

Immediately beneath the rearmost edge of the curved plate 29, at least two blowers 42 are arranged in side-by-side relationship across the width of the superstructure between the overlying curved plate 29 and the underlying floor plate 8. It will be seen from FIG. 1 of the drawings that the floor plate 8 is formed with a downward depression in order to enable it to accommodate the blowers 42. The housing of each blower 42 accommodates a rotor or impeller 43 which is fed with air through at least one opening 44 in the side of the housing concerned, said openings 44 being fed ,in turn, with air from the space between the floor plate 8 and the curved plate 29. The delivery openings 45 of the blowers 42 are located beneath the grating 37 and are directed in such a way that air which leaves them during use of the corp-drying system will move upwardly over the operative run of the conveyor 33 in a direction substantially parallel to the plan of that run. A number of thermocouples or other heat-sensitive elements 46 (FIG. 3) are located in positions which it is preferred should be along the upper edges of the curved plate 29 so as to govern a switching mechanism 47 controlling the rate of supply of fuel to the burners 40 and/or the ignition of the latter.

The leading stub shaft 18 projects forwardly beyond the bearing carried by the front wall 11 and is provided with a sprocket wheel 48 which is in driven connection, by way of a transmission chain 49 (FIG. 2), with a smaller sprocket wheel 50 fastened to a rotary shaft 51 that extends substantially parallel to the direction A at one side of the superstructure. The various moving parts of the crop-drying system which has been described are driven by transmission members most of which have been omitted from the drawings for the sake of clarity. However, it is emphasised that the moving parts may be driven from the power takeoff shaft of the towing tractor or other vehicle through the intermediary of an auxiliary transmission shaft of known construction or, alternatively, an internal combustion engine, electric motor or other source of rotary power may be provided on the vehicle upon which the crop-drying system is mounted. It will be appreciated that, if desired, the vehicle could readily be made self-propelled and be provided with the necessary steering and other systems.

In the use of the vehicle-mounted crop-drying system which has been described, the system is towed over the ground in the direction A, the rotary crop pickup mechanism 28 lifting cut crop from the ground and delivering it to the lowermost end of the feeding channel 22. The moving teeth 24 in the channel 22 elevate the picked-up crop to the chamber 21 from which said crop falls onto the outer surface of the rotating drum 19. Said crop slides downwardly over the convex surface of the drum 19 onto the upper concave surface of the plate 29. The drum 19 is rotated in a direction such that the strip 20 which it carries displaces the crop slowly to the rear of the superstructure along the concave surface of the plate 29. The crop will be subjected to a considerable crushing effect and this is generally desirable since the cell structure of the stems, leaves and so on is thus broken with a consequent release of the moisture contained therein. The crop is moved along the plate 29 with a pronounced squeezing action and this is effective in releasing still more of the moisture from the crop.

When the burners 40 are in use, the blowers 39 will deliver a stream of hot air through the combustion chamber that is bounded above by the curved plate 29 and beneath by the floor plate 8. The stream of hot air passes directly over the convex lower surface of the plate 29 and between the vertical plates 30 that afford ridge-like extensions of said plate 29. The plates 29 and 30 are thus heated, the plates 30 effectively constituting accumulators of thermal energy which can pass rapidly to the plate 29 by conduction. The high temperature to which the plate 29 is subjected causes the moisture in the crop which is being moved over said plate to be evaporated at a rapid rate. The evaporated moisture can escape to the atmosphere through the overlying metal gauze wall 31. There is an effective transfer of heat between the plate 29 and the crop by virtue of the fact that the drum 19 and strip 20 urge the crop firmly into engagement with the upper concave surface of the plate 29.

When the crop eventually arrives at the rear end of the curved plate 29, it passes onto the grating 37 and then to the upwardly moving leading run of the conveyor 33. The conveyor 33 elevates the crop to a position in which it falls through the delivery outlet 16 from where it may be collected in a wagon or the like coupled to the rear of the vehicle which supports the crop-drying system or, alternatively, it may fall back to the ground where it will be left lying in the form of a swath of less width than the vehicle itself provided that the profiled plates 13 are shaped in the preferred manner which has earlier been described. The dried crop can be picked up from the ground by a self-loading wagon or the like, by a baling machine or, in the case of very wet crop, the crop can be passed through the drying system for a second time. As the crop passes rearwardly over the grating 37 and upwardly along the conveyor 33, hot air from the previously mentioned combustion chamber is blown through and over it by the blowers 42. The crop is thus further dried, the moisture-laden air returning to the atmosphere through the metal gauze walls 32 and through the metal gauze wall which interconnected the latter. Since the blowers 42 are arranged side-by-side throughout the width of the superstructure, a substantially uniform air stream flows throughout the width of the conveyor 33.

The heat-sensitive elements 46 that are arranged at various points ensure that the temperature does not become excessive in any region of the superstructure since, when the temperature rises beyond a predetermined value at any point, one or more of the burners 40 will be automatically switched off in response to the particular area of the superstructure concerned by means of the switching mechanism 47. The drying process continues by virtue of the considerable thermal capacity of the curved plate 29 and the vertical plates 30 which are secured to it. When the temperature falls below a predetermined value, the or each extinguished burner 40 is automatically switched on again.

FIG. 4 illustrates a modification in which the metal gauze walls 31 and 32 are replaced by metal plates 52 formed with a large number of perforations 53. The rigidity of the system is thus considerably increased so that the likelihood of it becomes damaged by accidental collisions with various obstacles is correspondingly reduced. A particularly rapid and effective drying of moist crop can be produced with the constructions that have been described in which said crop is crushed to some extend while being moved along a heated plate.

The vehicle-mounted crop-drying system illustrated in FIG. 5 is basically similar to the system that has already been described and, therefore, parts that are similar, or identical, to the parts that have been mentioned in connection with FIGS. 1 to 4 of the drawings are indicated by the same reference numerals in FIG. 5. The superstructure has a floor 54 and upright side walls 55 both of which are afforded by two parallel metal plates 56 having a heat-insulating material 57, such as asbestos, sandwiched between them. There are, in this case, two longitudinally extending Archimedean screw conveyors each of which takes the form of a circular-cylindrical metal drum 58 having a corresponding metal strip 59 secured to it in helically surrounding relationship in the same way as the strip 20 surrounds the previously described drum 19. The overall diameter of each Archimedean screw conveyor is preferably not less than about 100 centimeters. The two conveyors that have just been mentioned are embraced from beneath by semicylindrical metal plates 60 and 61 whose axes of curvature substantially coincide with the axes of rotation of the corresponding drums 58. The lower convex surfaces of the plates 60 and 61 are provided with ridge-like extensions in the form of vertical plates 62 that lie parallel to the axes of rotation of the drums 58 and serve the same purpose as the previously described plates 30. Semicylindrical metal gauze walls 63 and 64 embrace the two Archimedean screw conveyors from above, their centers of curvature being substantially coincident with the axes of rotation of the corresponding drums 58. The walls 63 and 64 may, of course, be replaced by the perforated metal plates 52 (FIG. 4) if desired.

In the use of the crop-drying system, the two drums 58 are rotated in the relatively opposite directions indicated by arrows C and D in FIG. 5. The use of the two Archimedean screw conveyors gives the advantage that the superstructure of the vehicle may be lower which will be clear from a comparison between FIGS. 2 and 5 of the drawings. A large heated surface is, nevertheless, still available, said surface having a considerable thermal energy capacity by virtue of the provision of the plates 62. The insulated construction of the floor 54 and walls 55 may, if desired, be applied to various parts of the system previously described with reference to FIGS. 1 to 4 of the drawings. Although both the crop-drying systems that have been described are vehicle-mounted, it will be evident that it is not essential that a system in accordance with the invention should be a mobile one and that, if desired, such a system could be installed in a building or other fixed site and could be used to dry crop brought to it from the fields prior to storage or some form of processing.

Owing to the fact that with the embodiments described above the crop is urged into engagement with the heated plate, a very good and rapid transfer of heat is obtained, whereby the cells of the plants are crushed and the moisture is released from the crop. It is of advantage to convey the crop over the heated plate in a thin layer. For tender crop the plate can be heated in such a way that for instance a temperature of 150° C. is not exceeded so that a combustion of the crop is prevented.

Due to the rapid transfer of heat the crop-drying systems described above are very suitable for a practicable machine whereby the machine can have a great surface capacity.

Having thus described my invention, what I claim as new and desire to secure by Letters Patent of the United States is:

1. A crop-drying system comprising a device with heating means and Archimedean screw conveying means positioned adjacent said heating means within said device, said heating means including at least one burner mounted adjacent one end of said conveying means, said conveying means rotating about an axis of rotation to convey crop towards an exit in said device, a supporting member located adjacent said conveying means to be exposed to heat from said heating means, said supporting member including heat accumulation means having a heated surface over which crop is moved by said conveying means toward said exit, said burner extending generally parallel to the axis of rotation of said conveying means.

2. A crop-drying system comprising a device with heating means and conveying means within said device, a heated member located adjacent said conveying means whereby crop moved by said conveying means is moved over said heated member, a plurality of heat-sensitive elements mounted in said device for sensing the temperature at various points in said device during operation, said conveying means and said heated member being operatively associated with one another to exert a crushing action between one another on the crop being moved by said conveying means.

3. A system as claimed in claim 2 wherein said heated member over which the crop is moved in a metal plate.

4. A mobile crop drying system comprising a device having wheels and being movable over the ground, said device including heating means and conveying means positioned adjacent one another within said device, a crop pickup mechanism mounted in the forward end of said device for gathering crop on the ground and bringing same to said conveying means, said conveying means being movable to convey crop towards an exit in the rear end of said device, a heated member comprising a metal plate exposed to said heating means being positioned adjacent said conveying means, said metal plate comprising a surface over which crop is moved towards said exit.

5. A system as claimed in claim 4, wherein said metal plate is provided with a plurality of fin elements which are also heated by said heating means.

6. A system as claimed in claim 4, wherein said conveying means includes a mechanism arranged to push crop over said metal plate during operation.

7. A system as claimed in claim 6, wherein said metal plate is a curved plate, said conveying mechanism being arranged to move crop over said curved plate in a direction substantially parallel to the axis of curvature of said plate.

8. A system as claimed in claim 7, wherein said conveying mechanism includes at least one Archimedean screw conveyor.

9. A system as claimed in claim 8, wherein said convevying mechanism comprises two Archimedean screw conveyors positioned in side-by-side relationship to cooperate with each other.

10. A system as claimed in claim 9, wherein said two Archimedean screw conveyors rotate in opposite directions during operation.

11. A system as claimed in claim 9, wherein the distance between the axes of rotation of said two Archimedean screw conveyors is approximately equal to the diameter of one of them.

12. A system as claimed in claim 8, wherein the axis of rotation of said Archimedean screw conveyor extends substantially parallel to the longitudinal axis of said device.

13. A system as claimed in claim 8, wherein said Archimedean screw conveyor is a hollow drum having an outer convex curved surface with a helically wound strip.

14. A system as claimed in claim 8, wherein said curved plate is concave relative to the screw of said Archimedean screw conveyor whereby the latter moves closely over the inner curved surface of said plate.

15. A system as claimed in claim 14, wherein said curved plate subtends an angle of approximately 180° at the axis of rotation of said Archimedean screw conveyor.

16. A system as claimed in claim 8, wherein said plate forms a wall of the combustion chamber of said heating means.

17. A system as claimed in claim 16, wherein fin elements which are metal plate elements are provided that project from said curved plate into a combustion chamber.

18. A system as claimed in claim 8, wherein said heating means includes at least one burner mounted adjacent one end of said conveying mechanism.

19. A system as claimed in claim 18, wherein said burner extends generally parallel to the axis of rotation of said Archimedean screw conveyor.

20. A system as claimed in claim 18, wherein said device is elongated and a plurality of burners of said heating means are arranged in side-by-side relationship when said device is viewed in a direction substantially parallel to its longitudinal axis.

21. A system as claimed in claim 8, wherein said Archimedean screw conveyor has a diameter of at least about 100 centimeters.

22. A crop-drying system comprising a device with heating means including a combustion chamber and conveying means positioned adjacent one another within said device, said conveying means being movable to convey crop towards an exit in the rear end of said device, a heated member comprising a curved metal plate exposed to said heating means being positioned adjacent said conveying means, said metal plate comprising a surface over which crop is moved towards said exit, said conveying means including a mechanism having at least one Archimedean screw conveyor arranged to push crop over said metal plate during operation in a direction substantially parallel to the axis of curvature of said plate, said curved plate forming a wall of the combustion chamber of said heating means, fin metal plate elements projecting from said curved plate into said combustion chamber, said fin elements being arranged substantially parallel to the longitudinal axis of said conveying mechanism.

23. A crop-drying system comprising a device with heating means including a combustion chamber and conveying means positioned adjacent one another within said device, said conveying means being movable to convey crop towards an exit in the rear end of said device, a heated member comprising a curved metal plate exposed to said heating means being positioned adjacent said conveying means, said metal plate comprising a surface over which crop is moved towards said exit, said conveying means including a mechanism having at least one Archimedean screw conveyor arranged to push crop over said metal plate during operation in a direction substantially parallel to the axis of curvature of said plate, said heating means including at least one burner mounted adjacent one end of said conveying mechanism, said device being elongated and having a plurality of burners of said heating means arranged in side-by-side relationship when said device is viewed in a direction substantially parallel to its longitudinal axis, a combustion chamber being formed within the lower portion of said device and each burner being located near one end of said combustion chamber, at least one impeller being mounted adjacent the opposite end of said combustion chamber to withdraw combustion gases.

24. A system as claimed in claim 23, wherein the walls of said combustion chamber form parts of the superstructure of said device.

25. A crop-drying system comprising a device with heating means including a combustion chamber and conveying means positioned adjacent one another within said device, said conveying means being movable to convey crop towards an exit in the rear end of said device, a heated member comprising a curved metal plate exposed to said heating means being positioned adjacent said conveying means, said metal plate comprising a surface over which crop is moved towards said exit, said conveying means including a mechanism having at least one Archimedean screw conveyor arranged to push crop over said metal plate during operation in a direction substantially parallel to the axis of curvature of said plate, further conveying means being mounted in said device to receive crop at the delivery end of said Archimedean screw conveyor.

26. A system as claimed in claim 25, wherein said heating means includes at least one impeller arranged to blow combustion gases through and over crop carried by said further conveyor means.

27. A system as claimed in claim 26, wherein a grating is positioned between the delivery end of said Archimedean screw conveyor and said further conveyor means, the delivery opening of said impeller being located immediately beneath said grating.

28. A crop-drying system comprising a device with heating means including a combustion chamber and conveying means positioned adjacent one another within said device, said conveying means being movable to convey crop towards an exit in the rear end of said device, a heated member comprising a curved metal plate exposed to said heating means being positioned adjacent said conveying means, said metal plate comprising a surface over which crop is moved towards said exit, said conveying means including a mechanism having at least one Archimedean screw conveyor arranged to push crop over said metal plate during operation in a direction substantially parallel to the axis of curvature of said plate, an upper region of said Archimedean screw conveyor being covered by an apertured wall.

29. A crop-drying system comprising a device with heating means including a combustion chamber and conveying means positioned adjacent one another within said device, said conveying means being movable to convey crop towards an exit in the rear end of said device, a heated member comprising a curved metal plate exposed to said heating means being positioned adjacent said conveying means, said metal plate comprising a surface over which crop is moved towards said exit, said conveying means including a mechanism having at least one Archimedean screw conveyor arranged to push crop over said metal plate during operation in a direction substantially parallel to the axis of curvature of said plate, a conveyor being mounted in a chamber within said device at one end thereof to receive crop from said conveyor mechanism, said chamber including at least one wall with a plurality of apertures.

30. A system as claimed in claim 29, wherein said apertured wall is metal gauze.

31. A crop-drying system comprising a device with heating means including a combustion chamber and conveying means positioned adjacent one another within said device, said conveying means being movable to convey crop towards an exit in the rear end of said device, a heated member comprising a curved metal plate exposed to said heating means being positioned adjacent said conveying means, said metal plate comprising a surface over which crop is moved towards said exit, said conveying means including a mechanism having at least one Archimedean screw conveyor arranged to push crop over said metal plate during operation in a direction substantially parallel to the axis of curvature of said plate, said device having wheels and being movable over the ground, a crop pickup mechanism being mounted at the forward end of said device.

32. A system as claimed in claim 31, wherein a feeding channel is provided at the forward end of said device above said pick-up mechanism for elevating picked-up crop and dropping same on the upper surface at one end of said Archimedean screw conveyor.

33. A system as claimed in claim 32, wherein said conveyor is positioned to move crop to a delivery outlet whereby crop is deposited on the ground in the form of a swath.

34. A crop-drying system comprising a device with heating means and conveying means positioned adjacent one another within said device, said conveying means being movable to convey crop towards an exit in the rear end of said device, a heated member comprising a metal plate exposed to said heating means being positioned adjacent said conveying means, said metal plate comprising a surface over which crop is moved toward said exit, a plurality of heat-sensitive elements being mounted in said device for sensing the temperature at various points in said system during operation.

35. A system as claimed in claim 34, wherein said heat-sensitive elements are coupled with an electrical mechanism to switch on and off said heating means in accordance with the prevailing temperature sensed.

36. A system as claimed in claim 35, wherein said switching mechanism is arranged to switch on or off a heating apparatus of said heating means in accordance with the detected temperature at various points within said device.

37. A crop-drying system comprising a device with heating means and conveying means within said device, a heated member located adjacent said conveying means whereby crop moved by said conveying means is moved over said heated member, said conveying means and said heated member being operatively associated with one another to exert a crushing action between one another on the crop being moved by said conveying means, said heating means including at least one burner mounted at the front end of a combustion chamber, said device being elongated and said combustion chamber extending below said conveying means in the general direction of the longitudinal axis of said device, a plurality of heat-sensitive elements mounted in said device for sensing the temperature at various places therein during operation.

References Cited

UNITED STATES PATENTS

| | | | |
|---|---|---|---|
| 326,843 | 9/1885 | Breer | 263—22 |
| 1,061,941 | 5/1913 | Hoffmann | 263—25 |
| 2,217,665 | 10/1940 | Brown | 263—34 X |
| 2,235,311 | 3/1941 | Bullard | 263—25 |
| 3,341,186 | 9/1967 | Hoffman | 263—25 |

JOHN J. CAMBY, Primary Examiner

U.S. Cl. X.R.

34—110